Jan. 21, 1936.  I. MATROSSOFF  2,028,404
RAILWAY BRAKE
Filed Dec. 31, 1930  3 Sheets-Sheet 1
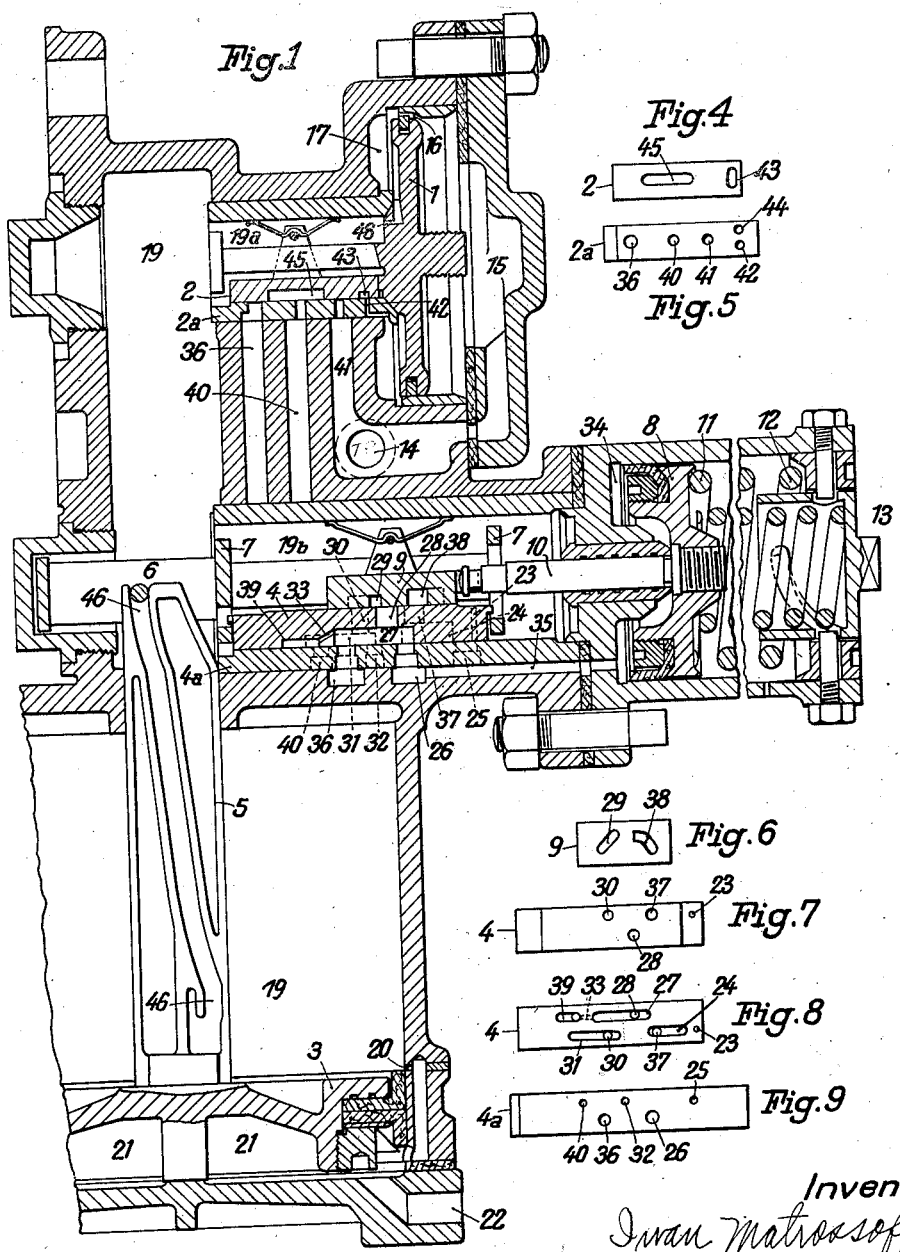
Inventor:
Ivan Matrossoff
By B. Singer, atty.

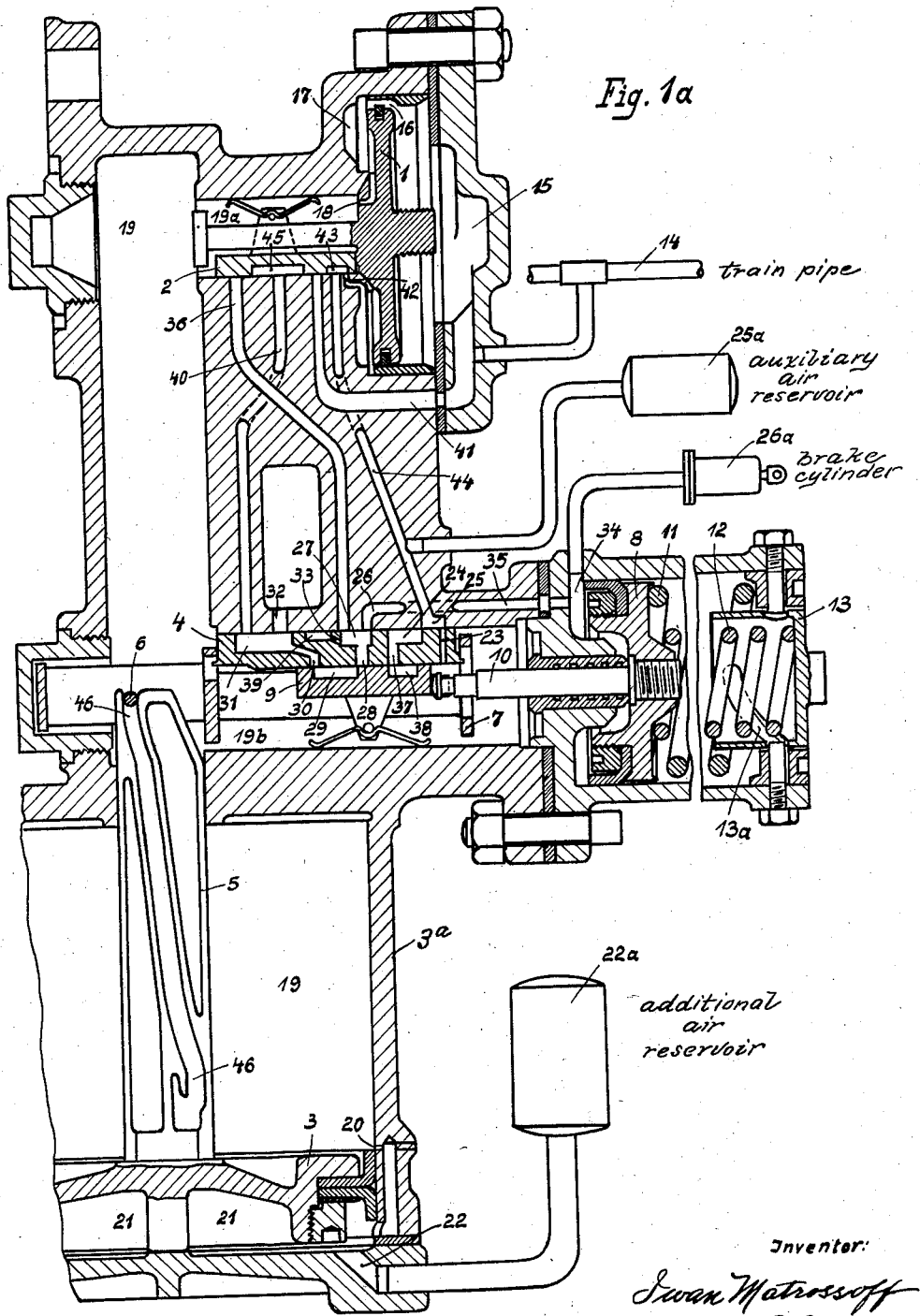

Jan. 21, 1936.  I. MATROSSOFF  2,028,404

RAILWAY BRAKE

Filed Dec. 31, 1930  3 Sheets-Sheet 3

Inventor:
Ivan Matrossoff
By B. Singer, Atty.

Patented Jan. 21, 1936

2,028,404

UNITED STATES PATENT OFFICE 2,028,404

RAILWAY BRAKE

Iwan Matrossoff, Leningrad, Union of Soviet Socialist Republics

Application December 31, 1930, Serial No. 505,849. In Union of Soviet Socialist Republics June 25, 1929

14 Claims. (Cl. 303—59)

Automatic brakes, not only direct acting brakes, but indirectly acting brakes, entail the following considerable difficulties in their manufacture and disadvantages in their operation.

1. The filling period of the brake cylinder from 0 atmosphere to full pressure depends on the distance travelled by the piston in the brake cylinder. To what extent the said distance affects the filling period of the brake cylinder is shown by the circumstance that according to the international agreements for this filling period 28 seconds are allowed for the shortest distance travelled by the piston and 60 seconds for the longest distance. In practice the difference between the filling periods is far greater, as on the one hand greater differences between the shortest and longest distance travelled by the piston are allowed and on the other hand the differences in the periods are still further increased by leakage losses in the brake cylinders.

This results in a retarded and unproportionally developed braking action, entailing on the one hand a jerky application of the brakes and on the other hand a lengthening of the braking distance.

2. The same occurs when releasing the brakes.

3. As for each brake cylinder diameter a suitable cross-section of the inlet openings is required, several types of control valves (triple valves) for the corresponding brake cylinders must be kept in stock at the same time. This increases the manufacturing costs of the brakes and entails difficulties and inconvenience in operation.

4. As is well known, the highest degree of steadiness in the application and release of the brakes is obtained by lengthening the time taken for the admission of the air into and the escape of the air out of the brake cylinder. This method, however, increases the braking distances.

The braking curve must therefore be so constituted that besides the maximum steadiness the shortest braking distance is obtained. In practice the braking operation should be somewhat as follows: after the initial sudden motion (rapid filling up to 0.5–0.6 of an atmosphere) the brake blocks must be gradually pressed against the tires; after the brakes have been applied to the whole train with some increase in pressure which prevents any further closing up of the cars, the forcing of the brake blocks against the tires must be still further accelerated. With brakes as at present constructed this cannot be effected, so that for obtaining the necessary steadiness it is necessary to increase the length of the filling time which, however, excessively lengthens and thus detrimentally affects the braking distances.

5. The inexhaustibleness of direct acting brakes with any given operating pressure is dependent on the controlling chambers being air tight.

Should, however, leakage occur between these chambers and the piston cups or the non-return valves, which always occurs during operation, the brake may fail, more particularly on a down grade.

6. In the case of direct acting brakes the controlling chamber must have a volume of from 15–20 litres of compressed air and great care must be taken to keep the parts air-tight.

The control valve according to the invention completely does away with the serious drawbacks referred to above and in addition to this makes the control considerably easier, both as regards overloading of the working chambers and as regards a graduated release of the brakes when used on long trains.

The present invention relates to a control valve for railway brakes, more particularly the brakes for freight trains, and consists more particularly in this, that a device controlling the feed and exhaust of air on the brake cylinder is governed by a main control piston moving with a precisely regulated speed.

For achieving this movement in one direction said main control piston is open to a working chamber filled with compressed air from the train pipe during one of the main operations (applying or releasing the brake), and during the other operation said working chamber is shut off from the train pipe and allowed to be slowly exhausted through a calibrated narrow passage. Thereby, said main control piston under the action of a spring or of a pneumatic loading means travels along with a speed corresponding to the speed of the pressure decrease produced in said working chamber by the exhaust of air through said narrow passage. This precise movement of the main control piston is transmitted to a brake cylinder control device in such a way that in correspondence to each position of said piston a certain air pressure in the brake cylinder is attained. This means that the brake cylinder pressures follow a curve the time measurement of which entirely depends on the movement of said piston, independently of the larger or smaller volume and tightness of the brake cylinder, and independently of the air consumption arising therefrom.

The brake cylinder control device consists of a slide valve or similar member connected to said main control piston, and of a secondary regulating member coacting with said first member and driven by the brake cylinder pressure in the same direction as said first member. Thereby said first member opens the brake cylinder feed to different extents, according to the positions of said main control piston, and said secondary member closes said feed at each time as soon as the different prescribed air pressures in the brake cylinder have been reached.

The air exhausted from the working chamber may be used for filling the brake cylinder, which additionally is filled from the supplementary reservoir by means of the brake cylinder control device, so that the time for altering the brake cylinder pressure is always equal to the time in which the pressure prevailing in the working chamber is altered.

For achieving the precisely regulated movement of the main control piston during releasing of the brake, the working chamber is fed with air through a calibrated narrow passage, so that also this movement has a precisely regulated speed, and consequently the release of the brake follows also a precise time curve.

The accompanying drawings show a constructional example of the invention.

Fig. 1 is a longitudinal section through the whole of the control valve or distributor.

Fig. 1ª is a section corresponding to Fig. 1, but showing a simplified arrangement of passages.

Fig. 4 is a view from below of the main line valve.

Fig. 5 is the face of the regulating member 2ª.

Fig. 6 is a view from below of the regulating valve.

Fig. 7 is a view from above of the main valve 4.

Fig. 8 is a view from below of the main valve 4.

Figure 2:
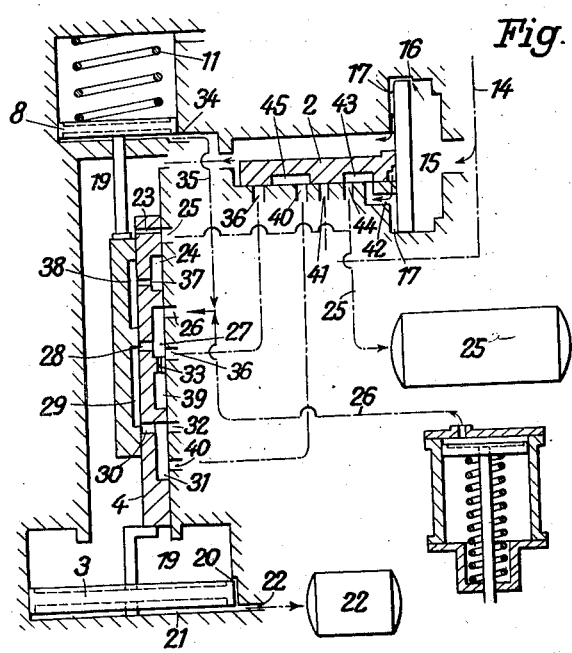
Fig. 2 is a diagram showing the piston and slide valve position for releasing the brakes and charging.
Figure 3:
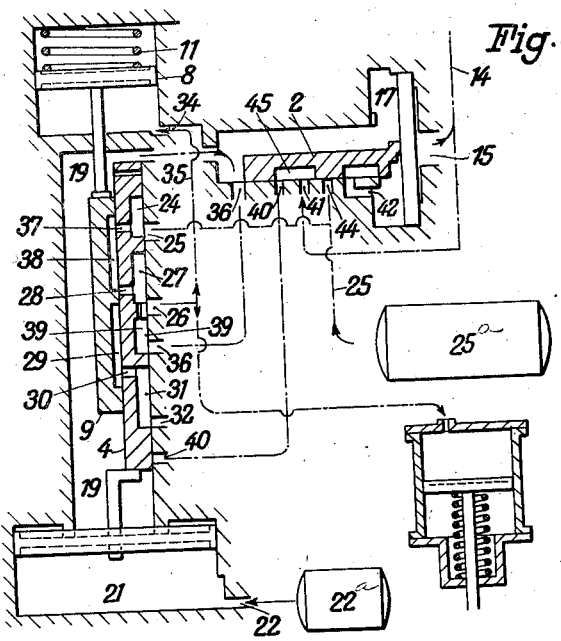
Fig. 3 is a similar diagram showing the parts in full braking position.

Fig. 9 is a view from above of the main regulating member. Fig. 1 corresponding to the construction as in actual use does not clearly show the individual passages. Hence Fig. 1ª has been used to show a slightly different position of the bars to make all passages clearly visible. In both of these figures all parts function in exactly the same way and they have the same reference characters, so that the specification refers to both of these figures at the same time.

According to the drawings, the air distributor consists of three sliding parts located in a casing and not connected between themselves. Each part on the whole consists of a piston and a D-valve, namely, the primary triple valve portion connected to the train pipe has the piston 1 and D-valve 2; the main part has the piston 3 and D-valve 4; the regulating part has the piston 8, D-valve 9 and springs 11 and 12.

The work of these parts can be divided up in such a manner, that the primary triple valve portion (piston 1 and D-valve 2) initiates the application and release of the brake, the main part (piston 3 and D-valve 4) regulates the build-up and release of brake cylinder pressure, the regulating part (piston 8, D-valve 9 and springs 11 and 12) determines the degree of pressure in the brake cylinder and keeps up the pressure as prescribed.

Piston 1 is connected with the D-valve 2 by a rod, into which the valve goes with a slight clearance. During the release the piston 1 is pressed against the ported bushing 2a; when applying the brake the piston is pressed against the gasket between the triple valve cap and the body. The piston 1 is influenced upon the right by the pressure of the train pipe, and on the left by the pressure of the working chamber 19. The main piston 3 has a cam bar 5 which goes into the rod or frame 7 of the D-valve 4 and by means of a sliding member 6 fastened on the said rod and cam groove 46 in the cam bar 5 the piston 3 transfers the motion to the D-valve 4. The comparatively great vertical motion of piston 3 is transformed by means of cam bar 5 and sliding members 6, 46, into a small horizontal motion of D-valve 4 moving over the face of the bushing 4a. The piston 3 is always under the pressure of working chamber 19 from above and under the pressure of the air trapped in the reservoir 22 from below, said air expanding into the chamber 21 below said piston according to an isotherme.

The piston 8 has a rod 10, which passes through a packing, due to which the chamber 34 is separated from the chamber 19b. The rod 10 is connected by a joint with the D-valve 9, which operates on the face of the main D-valve 4. The piston 8 is constantly under the pressure of the brake cylinder on the left and the springs 11 and 12 and atmosphere on the right with the spring 12 always in a free state when the brake is released and the spring 11 slightly presses on the piston.

When the brake is applied, the spring 12 is either ineffective if the train is unloaded, or it functions together with the spring 11, if the train is loaded. The effectiveness of the spring 12 is controlled by manually turning the bush 13, which has the directing screw 13a.

The air passing from the train pipe to the air-distributor by the opening 14 is carried to an additional reservoir 22a on the way 14, 15, 16, 17, 18, 19, 20, 21, 22, to the auxiliary air reservoir 25a by 25, and to the brake cylinder by 26.

When the pressure in the train pipe rises, the compressed air passing through the passage 14 fills the chamber 15, moves the piston 1 to the extreme left and by means of the opening 16 through the chamber 17 and a narrow opening 18 fills the working chamber 19. Under the pressure coming from the chamber 19 the main piston 3 descends and the compressed air through the opening 20 fills the chamber 21 and the additional reservoir 22a.

The brake cylinder at the same time is open to the atmosphere through the main and regulating D-valve 4 and 9 by a cavity 29 in the D-valve 9, by the opening 30, by the cavity 31 in the D-valve 4 and by a passage 32 in the body which leads directly into the atmosphere. The chamber 34 is always connected with the brake cylinder by means of passages 35 and 26. It is also connected with the atmosphere in the said position.

Therefore the regulating piston 8 is to be found (as illustrated in Figs. 1 and 2) in the extreme left position under the pressure of spring 11.

The supplemental air reservoir 25a over the channel 25 is charged in two ways.

1. Out of the feed groove 16 through the chamber 17, through the opening 42, through the cavity 43 in the D-valve 2, through the opening 44 in the bushing 2a of the D-valve 2, which is directly connected with the supplemental reservoir 25a through the passage 25.

2. Out of the feed groove 16 through the chamber 17, through the opening 18 (Fig. 1), through the chambers 19a and 19b, through the passage 23 in the main D-valve 4 and the passage 25 in its bushing, which leads directly into the supplemental reservoir 25a.

With the rapid and considerable lowering of the pressure in the train pipe, the pressure in the working chamber 19 will be unable to handle the pressure in the train pipe through the feed D groove 16, because of which the piston 1 will move to the right, will cover up the feed groove 16 and will pull the D-valve 2, by means of which there will be established the connection between the train pipe and the atmosphere through the passage 41, cavity 45 in the D-valve 2, through the passage and opening 40 in the bush of the main D-valve 4, through the cavity 31 in this D-valve and the atmospheric opening 32. There takes place a rapid local decline of the pressure in the train pipe, which will produce the action of the next appliance of the train with the same rapid lowering of the pressure in the train pipe and so forth. The result of such a start of work of each distributor will be the rapid distribution of the brake action over the whole train.

With the subsequent removal of the piston 1 to the right, almost simultaneously with the above described venting of the train pipe to the atmosphere, the D-valve 2 will uncover the opening 36 and the compressed air from the working chamber 19 will begin to quickly rush into the brake cylinder from the passage 36 through a cavity 27 in the D-valve 4 and through the passage 26, and connecting with the auxiliary reservoir 25a by means of channels 42 and 44 and the cavity 43 will be performed at the very beginning of the action of the D-valve 2.

The diameter and stroke of the main piston 3 are made as large as to secure a sure action, and the initial pressure decline in braking may amount to about 0.2 to 0.5 atmosphere, so that the pressure falls from 5 atmospheres to about 4.8 atmospheres, whereas in further braking said pressure falls to 3.7 atmospheres, which at once is the highest air pressure raising in the brake cylinder for full braking action. The air exhausted from chamber 19 is led to the brake cylinder for doing useful work instead of being uselessly exhausted to the atmosphere. The volume of the reservoir 22a is made so large as to expand from 5 to 3.7 atmospheres during the full upward movement of the piston 3.

All the said parts act in completely the same way for service and for emergency application of the brake, and the same is true also for the following operations.

As the pressure in the chamber 19 quickly declines, the piston 3 makes a sharp leap upwards, so as to cover the opening 20 and separate the D-valve chamber 19 from the reservoir 22a. The piston 3 communicates a motion to the right to the main D-valve 4 with the following consequences:

1. The feed port 23 in the main D-valve becomes covered and the working chamber 19 becomes disconnected from the supplemental reservoir.
2. The port 28 is covered and the brake cylinder is disconnected from the atmosphere.
3. The passage 40 is covered and the release of air from the main line ceases.
4. The rapid flow of air from the working chamber 19 into the brake cylinder through the large cavity 27 is covered and following this there begins a slow process of transmitting the air through a narrow opening 33 by means of a cavity 39, because of which the piston 3, after its rapid initial leap now moves along slowly.
5. There is established a connection of the supplemental reservoir with the brake cylinder by means of the passage 25, cavity 24, the opening 37 in the D-valve 4, the cavity 38 in the D-valve 9, the passage 28 and the cavity 27 in the D-valve 4 and the passage 26. Owing to this there will take place a farther rapid rise of the pressure in the brake cylinder, which was started by the air from the working chamber 19.

As soon as the pressure in the brake cylinder and consequently in the chamber 34 increases up to 0.6–0.7 atmosphere, which suffices for applying the brake blocks to the wheels, the piston 8 will overcome the primary tension of the spring 11 and begins to move to the right, pulls the D-valve 9 and covers the opening 28, and this results in the cessation of the fast rise of the pressure in the brake cylinder. The pressure in the working chamber 19 slowly decreases because of the fact that the air from it flows over into the brake cylinder only through a narrow passage 33. Therefore the piston 3 moves slowly upwardly under the action of the air trapped in the reservoir 22a and the D-valve 4 moves to the right and opens the opening 28. Because of this the air passes into the brake cylinder not only from the chamber 19 through a narrow opening 33, but also from the supplemental reservoir through the opening 28.

If the lowering of the pressure in the train pipe ceases, then the rise of the pressure in the brake cylinder continues until the pressure in the working chamber 19 becomes somewhat less than the pressure in the train pipe. When this occurs the piston 1, because of the greater balance of the pressure in the main line, will move to the left from its extreme right position and the D-valve 2 will cover the opening 36. The position 3 stops and the rise of the pressure in the brake cylinder ceases.

In case of a new and incomplete lowering of the pressure in the train pipe the piston 1 moves anew into an extreme right position and a new degree of application of the brakes takes place; the piston 3 moves still higher, and piston 8 moves more to the right. The piston 3 comes always to rest in such a position that the pressure of air is equal on both sides, if a slight difference due to the piston function is ignored.

A full stop takes place if the pressure in the train pipe is lowered from 1.2 to 1.3 atmospheres. Then the piston 3 rises to its extreme top position due to the above mentioned interrelation of the volumes of the working reservoir 22 and the chamber 19.

Any lowering of the pressure in the chamber 19 within the limits of 5 to 3.8 atmospheres (for instance to 4.4 atmospheres) forces the piston 3 up to a point where the pressure in the working reservoir 22a is essentially the same as in the chamber 19 (in our example 4.4 atmospheres);

A farther lowering of the pressure in the train pipe does not produce a further rise of the pressure in the brake cylinder, since the D-valve 4 does not move from its place any more.

The pressure produced in the brake cylinder when the brake is either fully or partially applied is maintained automatically for an indefinitely long period of time. If the given pressure in the brake cylinder lowers the piston moves to the left and by means of the D-valve 9 establishes a connection of the brake cylinder to the supplemental reservoir through the passage 38 and the opening 28, so as to reestablish the pressure in the brake cylinder as before, after which the piston 8 with its D-valve resumes its primary position.

The piston 3 covers its whole course from the extreme lower up to its extreme top position in a precisely predetermined time, say 40 seconds. Consequently, for full braking action the pressure in the brake cylinder always rises from zero to the limit in 40 seconds, independently of the amount of compressed air which the brake cylinder consumes due to its diameter and stroke, the leakage from the brake cylinder, and the adjustment of the brake for a loaded or an empty car. This is explained as follows.

The velocity of movement of the piston 3 depends essentially upon the ratio of the volume of chamber 19 to the narrow opening 33 forming the exhaust for said chamber 19, as a certain quantity of air enclosed under a certain pressure needs a precisely predetermined time for escaping through a passage of a certain area, and as said piston 3 follows said escapement and the corresponding pressure decrease of the air. This is not essentially altered by the circumstance that the said escapement of air does not take place to the atmosphere, but to the brake cylinder, nor has the air consumption of the brake cylinder any remarkable influence thereon.

If the volume of the brake cylinder should by chance be such, that in order to fill it up to 3.6 atmospheres there would be required just so much air, as it flows over from the working chamber 19, then the filling up of such a cylinder takes place in the same period of 40 seconds, during which the main piston shifts to its extreme top position and the regulating piston 8 together with its D-valve 9 goes during the process of applying the brake under the increasing air pressure in the brake cylinder to the right with the same velocity, with which the main D-valve goes to the right. But if, as usually happens, in order to fill up a brake cylinder a large volume of air is required, then the pressure in this cylinder tends to rise with a smaller velocity and the piston 8 with the D-valve 9 moves more slowly to the right. Thereby the necessary addition of air from the supplemental reservoir gains admission through the passages 25, 24, 37 and 38 into the opening 28, the cavity 27 and the passage 26, to the brake cylinder and the chamber 34. The greater the volume of the brake cylinder and also the greater the leakage, that is the greater the air volume needed for filling up the brake cylinder to 3.6 atmospheres, the more largely said passages are opened until the pressure of air becomes sufficient to force the regulating piston 8 with the D-valve 9 to the right with the same velocity with which the main D-valve 4 moves, depending upon the main piston 3.

Should the brake cylinder capacity be too small and filled by the air passing from the chamber 19 through the narrow opening 33 in less than 40 seconds, the piston 8 would go to the right at a somewhat greater speed than the main D-valve, so as to open the opening 28 and let the superfluous air out into the atmosphere through the passages 27, 28, 29, 30, 31, 32, whereupon the piston 8 again assumes the same speed as the main D-valve. In other words the filling of the brake cylinder would also in this case take place within the fixed time of 40 seconds. If both springs 11 and 12 are operating under load, in full braking the entire pressure in the brake cylinder (3.6) atmospheres is reached in 40 seconds. If, however, the spring 12 is made inoperative by turning block 13, when the cars are empty, full braking likewise takes place within 40 seconds, but the pressure then reaches only 2.0 atmospheres. Any correlation of air pressures may be obtained by the suitable selection of springs, and also by a partial turn of block 13.

Thus, brake cylinders consuming very different amounts of air are always fed during the same regular period of time, determined by the speed of movement of the main piston.

As the time distribution with which the pressure in the brake cylinder is raised depends on the speed at which D-valve 4 moves, and as the piston 3 driving said D-valve 4 has a given rate of movement, a special desired braking rate can only be attained by using a modifying member interposed between said members 3 and 4. This is accomplished by the cam bar 5 whose cam groove 46 is shaped with an adapted profile, so as to ascend for instance, slowly at first, then faster and finally quite smoothly.

When using the new brake for passenger trains a more quick rise of pressure in the brake cylinder is desirable. For this purpose the narrow passage 33 may be made regulable so as to become larger and produce quicker braking.

Brake releasing is effected by increasing the pressure in the train pipe. The piston 1 then moves to the extreme left and the air from the train pipe passes on the way 16, 17, 18 into chamber 19, and the piston 3 begins to go down. If the pressure in the train pipe is raised to its normal capacity, piston 3 makes its whole way to the extreme left again in 40 seconds due to the proportion of the narrow passage 18 to the volume of chamber 19.

As soon as D-valve 4 is shifted to the left by falling piston 3, the brake cylinder is opened to the atmosphere through 26, 27, 28, 29, 30, 31 and 32 and the air pressure in brake cylinder is released. Piston 8 under the pressure of the springs moves to the left and in connection with D-valve 4, preserves the established dimension of openings in passages 28 and 29 so that complete release takes place within 40 seconds, independently of the movement of the brake piston, brake cylinder volume and leakage, both for loaded and empty cars.

If the pressure in the train pipe and consequently in chamber 19 is gradually increased, the pressure in the brake cylinder also decreases by degrees. As soon as the increase of pressure in chamber 19 is stopped piston 3 and D-valve 4 stops immediately, whereas piston 8 still continues to move for a certain time until D-valve 9 covers the passage 28 and stops the exhaust of compressed air from the brake cylinder into the atmosphere.

Thus by keeping piston 3 during the brake releasing in any position between top and bottom, any degree of release can be obtained and the degree of pressure in the brake cylinder is automatically maintained as well as in gradual braking, the pressure in the supplemental reserve being maintained from the train pipe through 14, 15, 16, 17, 42, 43, 44 and 25.

At the beginning of the release when the primary D-valve 2 goes to the extreme left, the supplemental reserve communicates with chamber 17 through 42, 43, 44, 25, therefore not only would the compressed air be absorbed from the train pipe into the supplemental reserve but the air from the latter would pass to chamber 19 in the directions 25, 44, 43, 42, 17, 18, 19. This naturally would occur only in case of large capacity of supplemental reservoir and slight decrease of pressure therein during braking. For this purpose it is sufficient to arrange a supplemental reservoir of greater capacity or a separate release tank which allows accelerated braking and complete release. This quality is especially important in long freight trains. The passage 42 is calculated in such a way that the supplemental reservoir fills up more slowly than chamber 19, therefore as soon as D-valve 4 on its way back to the extreme left connects through opening 23 the chamber 19 to the supplemental reservoir, the pressure in chamber 19 decreases and piston 3 stops. As the top end of the cam groove 46 is straight this takes place under the approximate pressure of 4.8 atmospheres in chamber 19, or in general under a pressure of 0.2 atmospheres below the primary loading pressure. This on the one hand still more facilitates the release and on the other hand prevents the working chamber 22a from being filled in advance of the auxiliary reservoir.

Thus the new brake, besides the known feature, such as gradual braking and gradual release, adjustability for loaded and empty cars with one brake cylinder, and means of rapid transmission of the pressure wave to the whole train from the very beginning, possesses a number of new features still unknown, for example:

1. One standard triple valve is useful for any different brake cylinders.
2. The time required for filling the brake cylinder with air and for its release remains constant, whatever the volume of the brake cylinder may be, and notwithstanding the leakages, and both for loaded or empty cars.
3. The possibility of obtaining any time-pressure-ratio when filling the brake cylinder with air allows a saving of time in filling and renders the brake efforts smooth.
4. Full possibility of obtaining rapid release in the longest trains.
5. Pressure in the brake cylinder cannot exceed the calculated one at given loading pressure, that is, any danger of wedging the wheels is completely eliminated.
6. Adjustability for both loaded and empty cars, which is very important.

The new triple valve can be used for replacing the triple valve of other brakes according to the schemes of Humpry and Westinghouse.

What is claimed is,

1. In an air pressure brake system, particularly for railway cars, the combination with a train pipe, of an air distributor comprising a casing having a working chamber, a passage in said casing connecting said working chamber with the train pipe in the release position of the brake system, a second passage connecting said working chamber with the brake cylinder and normally closed in said release position, means controlled by the compressed air in said train pipe for closing said first passage and opening said second passage when the air pressure in said train pipe is decreased, a valve member controlling said second passage and adapted to feed air to said brake cylinder and exhaust the air therefrom, a main control piston in said working chamber acting upon said valve member to cause the same to feed air to said brake cylinder when the pressure in said train pipe decreases, an auxiliary valve member cooperating with said valve member to exhaust air into the atmosphere when the air pressure in said brake cylinder reaches a predetermined maximum, and an air reservoir adapted to be brought into communication with said working chamber when the latter is supplied with air from said train pipe, the air stored in said air reservoir being adapted to cause said main control piston to actuate said valve member and to force air into the said brake cylinder when the pressure in said train pipe decreases.

2. In an air pressure brake system as claimed in claim 1, wherein the first mentioned passage, serving for connecting the working chamber to the train pipe, is so proportioned with relation to the volume of said chamber that each pressure alteration produced by it in said chamber requires a certain measurable time.

3. In an air pressure brake system, particularly for railway cars, the combination with a train pipe, of an air distributor comprising a casing having a working chamber, a passage in said casing connecting said working chamber with the train pipe in the release position of the brake system, a second passage connecting said working chamber with the brake cylinder and normally closed in said release position, means controlled by the compressed air in said train pipe for closing said first passage and opening said second passage when the air pressure in said train pipe is decreased, a valve member controlling said second passage and adapted to feed air to said brake cylinder and exhaust the air therefrom, a main control piston in said working chamber acting upon said valve member to cause the same to feed air to said brake cylinder when the pressure in said train pipe decreases, an auxiliary valve member cooperating with said valve member to exhaust air into the atmosphere when the air pressure in said brake cylinder reaches a predetermined maximum, an air reservoir adapted to be brought into communication with said working chamber when the latter is supplied with air from said train pipe, the air stored in said air reservoir being adapted to cause said main control piston to actuate said valve member and to force air into the said brake cylinder when the pressure in said train pipe decreases, and means subjected to the air pressure in said brake cylinder for adjusting said auxiliary valve member relatively to said first mentioned valve member to discontinue the feed of air to said brake cylinder as soon as a predetermined pressure has been established in the latter and to connect said first mentioned passage with the atmosphere.

4. In an air pressure brake system, particularly for railway cars, the combination with a train pipe, of an air distributor comprising a casing having a working chamber, a passage in said casing connecting said working chamber with the train pipe in the release position of the brake system, a second passage connecting said working chamber with the brake cylinder and normally closed in said release position, means controlled by the compressed air in said train pipe for closing said first passage and opening said second passage when the air pressure in said train pipe is decreased, a valve member controlling said second passage and adapted to feed air to said brake cylinder and exhaust the air therefrom, a main control piston in said working chamber acting upon said valve member to cause the same to feed air to said brake cylinder when the pressure in said train pipe decreases, an auxiliary valve member cooperating with said valve member to exhaust air into the atmosphere when the air pressure in said brake cylinder reaches a predetermined maximum, an air reservoir adapted to be brought into communication with said working chamber when the latter is supplied with air from said train pipe, the air stored in said air reservoir being adapted to cause said main control piston to actuate said valve member and to force air into the said brake cylinder when the pressure in said train pipe decreases, an auxiliary cylinder on said casing, a piston slidably mounted therein and connected with said auxiliary valve member, and a conduit connecting said auxiliary cylinder with said brake cylinder to subject one side of said piston to the air pressure in said brake cylinder, said piston being adapted to adjust said auxiliary valve member relatively to said first mentioned valve member to discontinue the feed of air to said brake cylinder as soon as a predetermined pressure has been established in the latter and to connect said first mentioned passage with the atmosphere.

5. In an air pressure brake system, particularly for railway cars, the combination with a train pipe, of an air distributor comprising a casing having a working chamber with the train pipe in the release position of the brake system, a second passage connecting said working chamber with the brake cylinder and normally closed in said release position, means controlled by the compressed air in said train pipe for closing said first passage and opening said second passage when the air pressure in said train pipe is decreased, a valve member controlling said second passage and adapted to feed air to said brake cylinder and exhaust the air therefrom, a main control piston in said working chamber acting upon said valve member to cause the same to feed air to said brake cylinder when the pressure in said train pipe decreases, an auxiliary valve member cooperating with said valve member to exhaust air into the atmosphere when the air pressure in said brake cylinder reaches a predetermined maximum, an air reservoir adapted to be brought into communication with said working chamber when the latter is supplied with air from said train pipe, the air stored in said air reservoir being adapted to cause said main control piston to actuate said valve member and to force air into the said brake cylinder when the pressure in said train pipe decreases, an auxiliary cylinder on said casing, a piston slidably mounted therein, and connected with said auxiliary valve member, a conduit connecting said auxiliary cylinder with said brake cylinder to subject one side of said piston to the air pressure in said brake cylinder, said piston being adapted to adjust said auxiliary valve member relatively to said first mentioned valve member to discontinue the feed of air to said brake cylinder as soon as a predetermined pressure has been established in the latter and to simultaneously connect said first mentioned passage with the atmosphere, and manually adjustable spring means acting upon the other side of said piston for varying the pressure at which said auxiliary valve member is operated to discontinue the feed of air to said brake cylinder and to connect said first mentioned passage with the atmosphere.

6. In an air pressure brake system as set forth in claim 1, including another passage in said casing connecting said working chamber with said air reservoir, said passage in the normally released position of the brake system being open to the space of the working chamber which is connected with the train pipe and being closed by the main control piston when the latter starts its brake applying stroke, and means for continuously applying the pressure of the air in said air reservoir to that side of the main control piston which is opposed the side normally subjected to the train pipe pressure.

7. In an air pressure brake system, particularly for railway cars, the combination with a train pipe, of an air distributor comprising a casing having a working chamber, a passage in said casing connecting said working chamber with the train pipe in the release position of the brake system, a second passage connecting said working chamber with the brake cylinder and normally closed in said release position, means controlled by the compressed air in said train pipe for closing said first passage and opening said second passage when the air pressure in said train pipe is decreased, a valve member controlling said second passage and adapted to feed air to said brake cylinder and exhaust the air therefrom, a main control piston in said working chamber acting upon said valve member to cause the same to feed air to said brake cylinder when the pressure in said train pipe decreases, means for slidably supporting said valve member in a path rectilinear to the path of movement of said main control piston, an axially extending bar on said control piston having a substantially axially extending cam groove, a slidable frame in which said valve member is mounted, means on said frame engaging said cam groove whereby said valve member is moved a relatively short distance during a complete stroke of said main control piston, an auxiliary valve member cooperating with said valve member to exhaust air into the atmosphere when the air pressure in said brake cylinder reaches a predetermined maximum, and an air reservoir adapted to be brought into communication with said working chamber when the latter is supplied with air from said train pipe, the air stored in said air reservoir being adapted to cause said main control piston to actuate said valve member and to force air into the said brake cylinder when the pressure in said train pipe decreases.

8. In an air pressure brake system as set forth in claim 7, in which the cam groove in said axially extending bar on said main control piston is formed to effect a non-uniform movement of said valve member during a uniform movement of said main control piston.

9. In an air pressure brake system, particularly for railway cars, the combination with a train pipe, of an air distributor comprising a casing having a working chamber, a passage in said casing for establishing open communication between said working chamber and the train pipe in the release position of the brake system, a second passage connecting said working chamber with the brake cylinder and normally closed in said release position, means controlled by the compressed air in said train pipe for closing said first passage and opening said second passage when the air pressure in said train pipe is decreased, a valve member controlling said second passage and adapted to feed air to said brake cylinder and exhaust the air therefrom, said valve member being provided with a restricted passage adapted to cause a filling and exhaust of said brake cylinder in a predetermined length of time, a main control piston in said working chamber acting upon said valve member to cause the same to feed air to said brake cylinder when the pressure in said train pipe decreases, an auxiliary valve member cooperating with said valve member to exhaust air into the atmosphere when the air pressure in said brake cylinder reaches a predetermined maximum, and an air reservoir adapted to be brought into communication with said working chamber when the latter is supplied with air from said train pipe, the air stored in said air reservoir being adapted to cause said main control piston to actuate said valve member and to force air into the said brake cylinder when the pressure in said train pipe decreases to such an extent that said first passage is closed by said train pipe pressure controlled means.

10. A distributor for railway brakes, comprising in combination means for feeding air to and exhausting air from the brake cylinder, a main control piston operatively connected to part of said means, means for elastically pressing said control piston into its braking position, a control cylinder enclosing said piston, a first passage adapted to connect said cylinder to the train pipe, a further passage adapted to connect said cylinder to a space in which another pressure prevails than in said cylinder, and means dependent upon the train pipe pressure, for closing said first and opening said further passage during braking and for making the inverse operation during brake releasing, said further passage being so proportioned with relation to the volume of said cylinder that each pressure alteration produced by it in said cylinder requires a certain measurable time.

11. A distributor for railway brakes as claimed in claim 10, wherein the means for feeding air to and exhausting air from the brake cylinder consist of a valve device operatively connected to the control piston so as to open an inlet and close an exhaust on the brake cylinder during the braking movement of said piston, and including an auxiliary valve member dependent upon the brake cylinder pressure and coacting with said first valve device to close the inlet and open the exhaust, established by said valve device, upon a predetermined rise of the brake cylinder pressure.

12. An air distributor for railway brakes, comprising in combination means for controlling the feed of air to and the exhaust of air from the brake cylinder, a main control piston associated with said means, means adapted to store a predetermined amount of compressed air for moving said control piston into brake applying position, a cylinder in which said control piston is arranged for reciprocating movement, a passage establishing communication between said cylinder and the train pipe in the release position of the brake, another passage connecting said cylinder with the brake cylinder and normally closed in said release position, and means dependent upon the train pipe pressure for closing said first mentioned passage and opening said last named passage when the train pipe pressure is decreased during braking.

13. An air distributor for railway brakes, comprising in combination means for controlling the feed of air to and the exhaust of air from the brake cylinder, a main control piston associated with said means, an additional air reservoir adapted to store a predetermined amount of compressed air for moving said control piston into brake applying position, a cylinder in which said control piston is arranged for reciprocating movement, a passage establishing communication between said cylinder and the train pipe in the release position of the brake, another passage connecting said cylinder with the brake cylinder and normally closed in said release position, and means dependent upon the train pipe pressure for closing said first mentioned passage and opening said last named passage when the train pipe pressure is decreased during braking, said additional air reservoir being charged with air from said cylinder in the release position of the brake.

14. An air distributor for railway brakes, comprising in combination means for controlling the feed of air to and the exhaust of air from the brake cylinder, a main control piston associated with said means, an additional air reservoir adapted to store a predetermined amount of compressed air for moving said control piston into brake applying position, a cylinder in which said control piston is arranged for reciprocating movement, a passage establishing communication between said cylinder and the train pipe in the release position of the brake, another passage connecting said cylinder with the brake cylinder and normally closed in said release position, and means dependent upon the train pipe pressure for closing said first mentioned passage and opening said last named passage when the train pipe pressure is decreased during braking, said additional air reservoir being charged with air from said cylinder in the release position of the brake, the relative volume of said cylinder and said additional air reservoir being such that to each brake cylinder pressure prevailing in said brake cylinder there corresponds a definite position of said control piston.

IWAN MATROSSOFF.